2,881,595

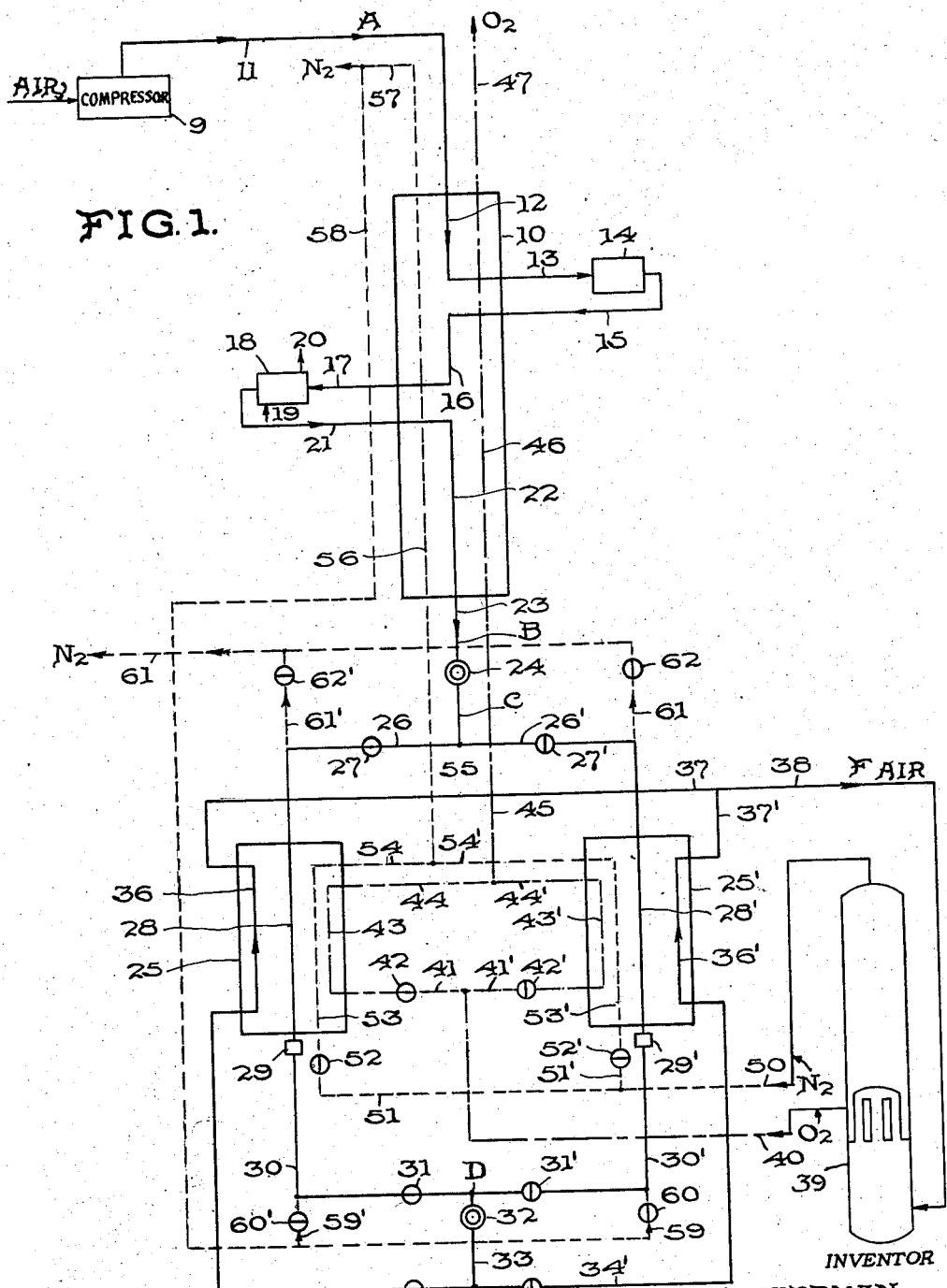

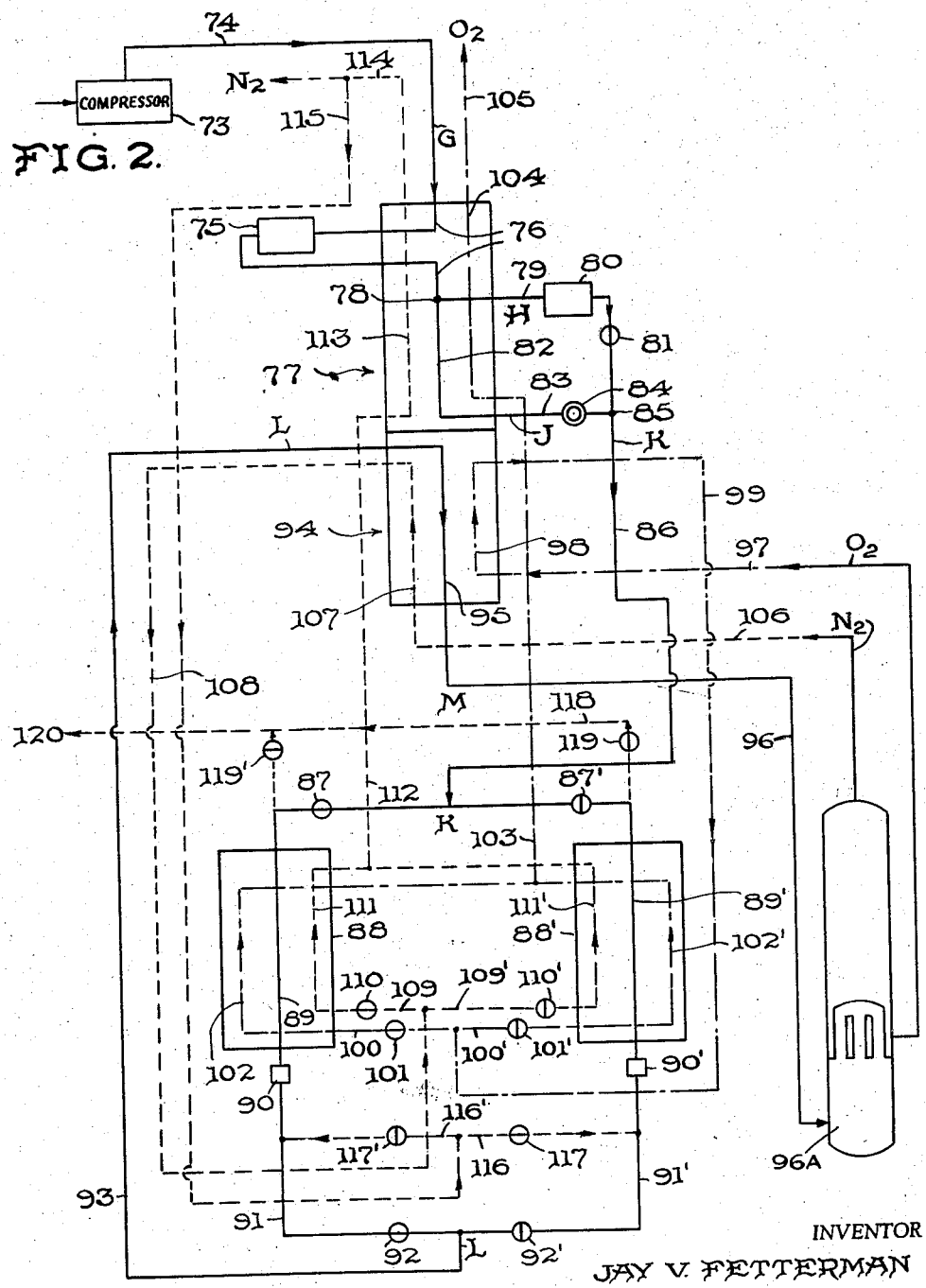

SEPARATION OF GASEOUS MIXTURES

Jay V. Fetterman, Emmaus, Pa., assignor to Air Products Incorporated, a corporation of Michigan Application October 28, 1953, Serial No. 388,746

24 Claims. (Cl. 62—13)

This invention relates to a method of and apparatus for eliminating high boiling point impurities prior to low-temperature separation of gaseous mixtures into low boiling point components, and more particularly to the removal of carbon dioxide and hydrocarbons from air which is to be separated into an oxygen fraction and a nitrogen fraction by low-temperature fractionation.

The presence of higher boiling point impurities in a gaseous mixture of relatively lower boiling point gases causes considerable difficulty during separation by low-temperature fractionation. These impurities deposit out at the low-temperatures employed in the fractionation and in time build up to such an extent that it becomes necessary to shut down operations and remove the impurities. In the past, it has been customary to eliminate these impurities chemically; however, such as elimination step requires the use of large reactant beds through which the gas is drawn or of scrubbing towers for scrubbing the gas with an impurity absorbing solution, either of which systems involves large expenditures for equipment and operation. It has also been proposed to filter out the impurities from a liquefied fraction in which they have been solidified. This method has not been too successful for several reasons. For example, when attempting to use filters to remove all of the impurities, the collected mass of solid plugs the filter surfaces far too rapidly for efficient operation even when using several filters in parallel.

It is an important object of the present invention to provide an improved method and apparatus for eliminating higher boiling point impurities from a gaseous mixture to be subsequently separated by fractionation at low-temperatures.

It is a still further object of the present invention to provide a method and apparatus for freezing out the higher boiling point impurities from a gaseous mixture to be subsequently separated by low-temperature fractionation.

It is a still further object of the present invention to provide a method of and apparatus for freezing out impurities from a gaseous mixture wherein the cooling zone in which the impurities deposit is provided in duplicate so that one zone can be defrosting while the other zone is depositing so as to give continuous operation.

It is a still further object of the present invention to provide a method of and apparatus for cooling a mixture of gases prior to its fractionation wherein the higher boiling point impurities are removed and the resultant mixture of gases is supplied to the fractionating operation with the proper vapor-liquid ratio for optimum operation.

These and other objects and advantages of this invention will become more apparent from the following description taken with the accompanying drawings wherein:

Figure 1 is a diagrammatic view of one embodiment illustrating the principles of this invention; and Figure 2 is a similar view of another embodiment illustrating the principles of this invention.

Referring to Fig. 1, air which has been previously compressed and cooled to ambient temperature enters heat interchanger 10 at 11 as indicated by the solid line and flows through passageway 12 of the heat interchanger 10. In passing through this passageway, the air is brought to a temperature close to, but slightly above, the freezing point of water by heat interchange with gaseous fractionation products flowing countercurrently through the interchanger.

At the temperature reached in this step, the major portion of the original water content of the stream is condensed in the form of a mist, and the stream emerging from passageway 12 is passed through conduit 13 into a condensate trap and drier represented by the numeral 14. The drier may be an adsorption system wherein silica gel, activated alumina or another solid adsorbent substance removes virtually all of the moisture from the air stream. If desired, a pair of adsorbers arranged in parallel may be provided so that continuous operation is permitted, one being regenerated while the other is adsorbing.

The dry air stream leaving the drier 14 passes through conduit 15 and returns to heat interchanger 10 and passes through a second stage of cooling in passageway 16. In passing through passageway 16, the air stream is further cooled by heat interchange with partially warmed column products. The air stream leaves the interchanger and flows through conduit 17 to an auxiliary refrigerating system 18. In this system, the air surrenders heat to a liquid refrigerant, such as Freon, boiling at a temperature materially above that at which either of the products of fractionation enter the interchanger. The refrigerant is shown entering the system at 19 and leaving at 20.

From auxiliary interchanger 18, the air stream returns via conduit 21 to a third stage of cooling in the heat interchanger 10 during its passage throguh passageway 22. From this passageway, the air stream passes through conduit 23 to an expansion valve 24 wherein it is expanded to an intermediate pressure.

The expanded stream is next passed through one of the carbon dioxide precipitation chambers 25 or 25'. As illustrated, chamber 25 is on stream and the air stream flows from the expansion valve 24 through conduit 26, control valve 27 and finally through passageway 28 of precipitation chamber 25 wherein virtually all of the carbon dioxide content of the air is precipitated out of the stream and is deposited therein.

The air stream leaving the carbon dioxide precipitation chamber 25 passes through a filter 29 to remove any minor amount of entrained solidified carbon dioxide, and through conduit 30 and control valve 31 to a second expansion valve 32 wherein the stream is expanded to essentially the operating pressure of the air fractionating column to which it is subsequently passed. The stream is now returned to the carbon dioxide precipitation chamber 25 via conduit 34 and control valve 35 to passageway 36 therethrough. The air stream leaves passageway 36 through conduit 37 and passes through conduit 38 to a conventional air fractionating column 39.

The cold oxygen product from the air fractionating column returning in conduit 40, as indicated on the drawing by a dash-dot line, flows to the carbon dioxide precipitation chamber 25 through conduit 41 and control valve 42. The oxygen stream flows through passageway 43 in the carbon dioxide precipitation chamber 25 and then through conduits 44 and 45 to passageway 46 through the heat interchanger 10. The oxygen stream gives up its cold to the air stream in its passage through the precipitation chamber 25 and the interchanger 10 leaving the system through conduit 47 at ambient temperature.

The cold nitrogen product from the air fractionating column returning in conduit 50, as shown on the drawings by a broken line, flows to the chamber 25 via conduit 51 and control valve 52 passing through passageway 53 in the chamber 25. The stream thence flows through conduits 54 and 55 to passageway 56 through interchanger 10, leaving through conduit 57. The cold nitrogen stream gives up its cold to the incoming air stream during its passage through the chamber 25 and the interchanger 10, leaving at ambient temperature.

A small portion of the warm nitrogen leaving interchanger 10 through conduit 57 is diverted through conduit 58, conduit 59 and control valve 60 to the carbon dioxide filter 29' and passageway 28' in the carbon dioxide precipitation chamber 25' which is out of service. This warm nitrogen stream removes any carbon dioxide which has accumulated in the filter 29' and in the passageway 28' in the chamber 25'. The nitrogen stream is thence discharged to the atmosphere through conduit 61 and control valve 62.

In the operation of the system as shown in Figure 1, the carbon dioxide in the incoming compressed air stream remains in the gaseous state in the air stream during the cooling in interchanger 10 and the expansion in expansion valve 24. All of the carbon dioxide is precipitated from the air during the passage of the air stream through the carbon dioxide precipitation chamber 25. The passageways 36, 43 and 53 through the carbon dioxide precipitation chamber are preferably in the form of coils, and the air stream flows in the passage around these coils depositing the carbon dioxide on the external surfaces of the coils. However, the air stream can also be passed through a conduit in heat exchange relation with the colder streams and deposit the carbon dioxide on the internal walls of this conduit.

The air leaving the carbon dioxide precipitation chamber 25 has been cooled to the point that it has a high liquid content. For optimum operation in the case of liquid producing plants or pump plants, the liquid content of the feed to the column should be approximately 30%. In straight gas producing plants, it should be about 5 to 10%. Consequently the stream of air is again passed through chamber 25 via line 36 so as to warm it up and vaporize some of the liquid therein. The air leaves chamber 25 through conduit 38 with the required liquid content and at the pressure required in the fractionating column.

The use of an intermediate expansion step between points B and C instead of cooling the incoming gas directly down to the carbon dioxide precipitation temperature and then expanding it in one step to the pressure required for the fractionating column feed is advantageous. I have found that the carbon dioxide has a broader temperature range of deposition at the lower intermediate pressure than at the higher pressure and hence for a heat exchanger 25 of usual design will deposit over a greater length of the same than it would at the higher pressure. As a result, a larger surface area for carbon dioxide deposition is made available.

The following is a specific example of the pressures and temperatures throughout a liquid producing or pumping system. The air entering the system at point A is at a temperature of approximately 300° K. and has been compressed to 170 atmospheres. In passing through interchanger 10, the stream is cooled so that at point B the temperature of the stream is above the temperature at which carbon dioxide would begin to deposit from air at a pressure of 170 atmospheres containing approximately 325 parts per million of carbon dioxide. The latter figure has been adopted since it is representative of the average carbon dioxide content of incoming air into a separation system. In this example, the air is cooled to 180° K. in passing through interchanger 10. Air under a pressure of 170 atmospheres and 180° K. and containing approximately 325 parts per million of carbon dioxide will not deposit carbon dioxide therefrom. Between points B and C, the air is expanded to a lower intermediate pressure at which resulting pressure and temperature the carbon dioxide still remains as a gas in the air—for example, the air is expanded to 75 atmospheres with a resulting temperature of approximately 160° K.

In passing through the chamber 25, it is essential that the air be cooled to a point at which virtually all of the carbon dioxide content of the air has been removed. Air having a carbon dioxide content of not more than three parts per million has been found to be satisfactory for air entering the fractionator. At point D, the air at 75 atmospheres has been cooled in chamber 25 to a temperature of 125° K. At this temperature and pressure the carbon dioxide content will have been reduced to less than three parts per million. In expansion valve 32, the stream is expanded to a pressure of 7 atmospheres at which pressure the stream enters the column. The stream at point E after the expansion will have a liquid content of about 70%, and in flowing through the passageway 36 to point F the stream gives up some of its cold and attains a liquid content of 30% which is satisfactory for feeding to the fractionating column.

After the carbon dioxide deposition chamber 25 has been fouled with deposits of carbon dioxide, the valves 27, 27'; 31, 31'; 35, 35'; 42, 42'; 52, 52'; 60, 60'; and 62, 62' are reversed so that the warm nitrogen defrosting stream now flows through the fouled chamber 25 to defrost it while the remaining streams flow through the chamber 25' which has been previously defrosted. Since the moisture is removed in the drier 14, there is no problem due to the deposition of impurities in the passageways of interchanger 10. Since interchanger 10 does not become fouled with impurities, only one interchanger is needed for this phase of the cooling whereas the carbon dioxide precipitation chambers are provided in duplicate for continuous operation.

Although particular temperatures and pressures have been given in the above example, it should be realized that they are merely illustrative and that any temperatures and pressures may be used so long as the air containing the carbon dioxide impurity does not deposit the carbon dioxide under the conditions existing at points B and C, and that virtually all of the carbon dioxide will have been deposited under the conditions of the air at point D.

In the embodiment of the invention shown in Figure 2, the incoming air stream is compressed at 73 and is conducted by conduit 74 through passageway 76 of interchanger 77 to point 78. As in the case of the Figure 1 modification of the invention, the flow of air through passageway 76 is interrupted at the point the air obtains a temperature close to, but slightly above, the freezing point of water so that the water content thereof may be removed by condensation trap and drier 75. A portion of the high pressure air leaves the interchanger 77 at point 78 through conduit 79 to an expansion engine 80. The portion thus diverted is controlled by valve 81. The remainder of the air stream continues through the interchanger through passageway 82, leaving the interchanger through conduit 83. This stream is expanded in expansion valve 84 to a pressure corresponding to that to which the diverted stream has been expanded in the expansion engine 80. The two streams are merged at 85 and flow through conduit 86 and control valve 87 to the carbon dioxide precipitation chamber 88 which is on stream while the chamber 88' is being defrosted. The air stream flows through passageway 89 in chamber 88 wherein the carbon dioxide content of the air is deposited. Any minor portion of solidified carbon dioxide carried along by the stream is removed in filter 90. The carbon dioxide-free stream of air flows through conduit 91, control valve 92 and conduit 93 to the interchanger 94 wherein the stream is further cooled while passing through passageway 95. The air stream leaves the interchanger 94 through conduit 96 and is thence conducted to the air fractionator 96A.

The cold oxygen product from the fractionator returning through conduit 97 first passes through passageway 98 in interchanger 94, and thence flows through conduits 99 and 100 and control valve 101 to the carbon dioxide precipitation chamber 88. The oxygen stream flows through passageway 102 in chamber 88 and thence through conduit 103 to the interchanger 77. The oxygen stream gives up its remaining cold to the incoming air stream while flowing through passageway 104 in the interchanger 77 leaving the system at ambient temperature through conduit 105.

The cold nitrogen product from the fractionator returning in conduit 106, first passes through passageway 107 in interchanger 94. This stream next flows through conduits 108, 109 and control valve 110 to passageway 111 through the carbon dioxide precipitation chamber 88. The nitrogen stream thence flows through conduit 112 to passageway 113 through interchanger 77 wherein the stream gives up its remaining cold to the incoming air stream. A portion of the warm nitrogen stream leaving interchanger 77 through conduit 114 at ambient temperature is diverted through conduit 115, 116 and control valve 117 to the filter 90' and carbon dioxide precipitation chamber 88' which is out of service. The warm nitrogen stream defrosts the chamber 88 removing all of the carbon dioxide previously deposited therein, and flows through conduit 118 and control valve 119 leaving the system at 120.

In the operation of the system as shown in Figure 2, the carbon dioxide in the incoming compressed air stream remains in the gaseous state during its cooling in interchanger 77 and its expansion in expansion valve 84 and expansion engine 80. During the passage of the air through the chamber 88, virtually all of the carbon dioxide is precipitated from the air and is deposited in the interchanger, any minor proportion of entrained carbon dioxide being filtered out in filter 90. In this embodiment of the invention, the air stream leaves the precipitation chamber 88 entirely in the gas phase and it is not necessary to subsequently heat the air stream to vaporize the liquid therein as in the scheme shown in Figure 1. On the other hand, further cooling is necessary to attain the proper liquid content.

The temperatures and pressures at the points G, H, J, K, L and M are so controlled that at point K none of the carbon dioxide has yet been deposited from the air stream and the pressure of the stream is at the pressure desired for its subsequent entry into the fractionator. At point L, all of the carbon dioxide has been deposited from the air stream, and at point M, the gaseous stream contains the required liquid content for the type of system employed.

For example, the air stream entering at G containing approximately 325 parts per million of carbon dioxide has been compressed to 100 atmospheres and cooled to 300° K. The portion removed from the interchanger at point H has been cooled to 235° K. In the expansion engine, this portion is expanded and cooled so that at point K the stream is under a pressure of 7 atmospheres and at a temperature of 150° K. The remaining portion of the air flowing through passage 82 is further cooled to a temperature of about 197° K. at point J. The expansion in valve 84 reduces the pressure to 7 atmospheres and a temperature of 150° K. In flowing through chamber 88, virtually all of the carbon dioxide is deposited during the further cooling of the stream to 110° K. at point L. The stream is further cooled in interchanger 94 until the stream leaving at point M to the fractionator has a liquid content of 30% as required in a pumping plant.

Instead of an expansion engine at 80, any auxiliary refrigeration unit such as a Freon cooler may be utilized. In such event, the stream is expanded in valve 81 to the desired final pressure.

It will thus be seen that flow through interchangers 77 and 94 is continuous since the moisture is removed chemically from the incoming air and the conditions are so controlled that none of the carbon dioxide is deposited during passage of the air therethrough. When the carbon dioxide deposit in chamber 88 has built up to the point where it interferes with the flow of the air and efficient heat interchange, the valves are reversed and the warm nitrogen stream flows to the chamber 88, and the other streams flow to the chamber 88' which has been previously defrosted. This warm nitrogen stream evaporates the carbon dioxide previously deposited in chamber 88, while the carbon dioxide is being deposited in chamber 88'.

In prior systems proposed for freezing out carbon dioxide, the entire path of the interchanger is at least duplicated so that one interchanger can be defrosted while the other collects the deposit. In the present system, it is only necessary to provide a small portion of the interchanger path in duplicate, and the conditions are so controlled that all of the carbon dioxide deposits in that small part of the interchanger, thus effecting a substantial saving in the cost of equipment and amount of heat lost during defrosting.

The foregoing description of the present invention is for the purpose of illustration and is not limiting to the scope thereof which is set forth in the claims.

I claim:

1. Apparatus for cooling compressed gaseous mixture including low boiling components by countercurrent heat interchange with returning cold product of a low temperature fractionating operation and for removing a high boiling impurity from the mixture during the cooling, the compressed mixture being under pressure greater than the pressure of the fractionating operation, comprising a non-switching heat interchanger having a plurality of passageways therethrough in heat exchange relation with one another, a pair of impurity precipitation chambers arranged in parallel, each of the chambers being provided with a plurality of passageways therethrough in heat exchange relation with one another, expansion means, means for directing compressed gaseous mixture through a first passageway of the heat interchanger to the expansion means and thence through a passageway of one of the chambers, means for directing returning cold product through another passageway of the one chamber in countercurrent flow relation to the gaseous mixture in the first passageway and through another passageway of the heat exchanger, and means for simultaneously switching the flow of gaseous mixture and returning cold product from the one chamber to the other chamber while maintaining the paths of flow of gaseous mixture and returning product in the heat interchanger.

2. Apparatus for cooling compressed gaseous mixture including low boiling components by countercurrent heat interchange with returning cold product of a low temperature fractionating operation and for removing high boiling impurity from the gaseous mixture during the cooling, the compressed gaseous mixture being under a pressure greater than the pressure of the fractionating operation, comprising a non-switching heat interchanger having a plurality of passageways therethrough in heat exchange relation with one another, a pair of impurity precipitation chambers arranged in parallel, each of the chambers being provided with a plurality of passageways therethrough in heat exchange relation with one another, a heat exchange device having a plurality of passageways therethrough in heat exchange relation with one another, expansion means, means for directing compressed gaseous mixture through a first passageway of the heat interchanger to the expansion means and thence through a passageway of one of the chambers and thence through a passageway of the heat exchange device, means for directing returning cold product through a second passageway of the heat exchange device and through another passageway of the one chamber in countercurrent flow relation to the gaseous mixture in the one passageway and through a second passageway of the heat interchanger, and means for simultaneously switching the flow of gaseous mixture and returning cold product from the one chamber to the other chamber while maintaining the flow of the gaseous mixture and returning product in the heat interchanger.

3. Apparatus for cooling compressed gaseous mixture including low boiling components by countercurrent heat interchange with returning cold product of a low temperature fractionating operation and for removing a high boiling impurity from the mixture during the cooling, comprising a heat interchanger having a plurality of passageways therethrough in heat exchange relation with one another, a pair of impurity precipitation chambers arranged in parallel, each of the chambers being provided with a plurality of passageways therethrough in heat exchange relation with one another, two expansion valves, means for directing gaseous mixture through the heat interchanger and thence through one of the expansion valves and thence through a first passageway of one of the chambers and thence through the other expansion valve and finally through a secondary passageway of the one chamber in countercurrent relation to the flow of gaseous mixture through the first passageway, means for directing returning cold product through another passageway of the one chamber in countercurrent relation to the flow of gaseous mixture in the first passageway and thence through another passageway of the heat interchanger in countercurrent relation to the flow of gaseous mixture therethrough, means for directing warm product leaving the interchanger to the other chamber to remove impurity which has deposited in the same, and means for switching the flow of gaseous mixture and returning product from the one chamber to the other chamber and the flow of warm product from the other chamber to the one chamber.

4. Apparatus for cooling compressed gaseous mixture including low boiling components by countercurrent heat interchange with returning cold product of a low temperature fractionating operation and for removing a high boiling impurity from the mixture during the cooling, the compressed gaseous mixture being under a pressure greater than the pressure of the fractionating operation, comprising a non-switching interchanger having a plurality of passageways therethrough in heat exchange relation with one another, a pair of impurity precipitation chambers arranged in parallel, each of the chambers being provided with a plurality of passageways therethrough in heat exchange relation with one another, a heat exchange device having a plurality of passageways therethrough in heat exchange relation with one another, expansion means, means for directing compressed gaseous mixture through a first passageway of the heat interchanger to the expansion means and thence through one passageway of one of the chambers and thence through a passageway of the heat exchange device, means for directing returning cold product through a second passageway of the heat exchange device and through another passageway of the one chamber in countercurrent flow relation to gaseous mixture in the one passageway and through a second passageway of the heat interchanger, means for directing warm product from the heat interchanger through the other chamber, and means for simultaneously switching the flow of gaseous mixture and returning cold product from the one chamber to the other chamber and the flow of warm product from the other chamber to the one chamber while maintaining the path of flow of gaseous mixture and returning product in the heat interchanger.

5. Apparatus for cooling a compressed gaseous mixture including low boiling components by countercurrent heat interchange with returning cold product of a low temperature fractionating operation and for removing a high boiling impurity from the mixture during the cooling, comprising a heat interchanger having a plurality of passageways therethrough in heat exchange relation with one another, a pair of impurity precipitation chambers arranged in parallel, each of the chambers being provided with a plurality of passageways therethrough in heat exchange relation with one another, two expansion valves, means for directing gaseous mixture through a first passageway of the heat interchanger to one of the expansion valves and thence through a passageway of one of the chambers and thence to the other expansion valve and then through a second passageway of the one chamber in countercurrent relation to the flow of gaseous mixture in the first passageway, means for directing returning cold product through the other passageway of the one chamber in countercurrent relation to the flow of gaseous mixture through the first passageway and thence through another passageway of the heat interchanger in countercurrent relation to the flow of gaseous mixture therethrough, and means for switching the flow of gaseous mixture and returning cold product from the one chamber to the other chamber.

6. The method of cooling compressed gaseous mixture including low boiling components by countercurrent heat exchange with returning cold product of a low temperature fractionating operation and for removing a high boiling normally gaseous impurity from the mixture during the cooling, the gaseous mixture being compressed to a pressure greater than the pressure of the fractionating operation, which method comprises cooling compressed gaseous mixture to a temperature above that at which high boiling impurity is deposited as a solid by passing gaseous mixture in heat interchange relation with partially warmed product of the fractionating operation, expanding the total compressed partially cooled gaseous mixture to a lower pressure, the pressure and temperature conditions after expansion being such that high boiling impurity does not deposit as a solid, cooling expanded gaseous mixture to a temperature below that at which high boiling impurity is deposited as a solid by passing expanded gaseous mixture through a second step of heat interchange relation with product of the fractionating operation colder than the product in the first heat interchange step, switching the flow of gaseous mixture and returning product periodically so that the second step of heat interchange takes place alternately in a pair of zones, and removing deposited solid impurity from each of the zones when the second heat exchange step takes place in the other zone.

7. The method as set forth in claim 6 wherein a portion of warm product leaving the first step of heat interchange is passed through each of the zones when the second heat exchange step takes place in the other zone for removing deposited solid impurity from the zones.

8. The method as set forth in claim 6 wherein substantially impurity-free gaseous mixture leaving the second step of heat interchange is expanded to a pressure existing in the fractionating operation and the thus expanded gaseous mixture is passed through the zone in which the second heat interchange step is taking place in countercurrent heat interchange relation with gaseous mixture flowing therethrough.

9. The method as set forth in claim 8 wherein warm product leaving the first step of heat interchange is alternately passed through the zones for removing deposited solid impurity from the zones.

10. The method of cooling gaseous mixture including low boiling components by countercurrent heat exchange with returning cold product of a low temperature fractionating operation and of removing high boiling impurity from the gaseous mixture during the cooling, the gaseous mixture being compressed to a pressure greater than the pressure of the fractionating operation, which method comprises passing compressed gaseous mixture in heat interchange relation with partially warm product of the fractionating operation in a first heat interchange step to cool compressed gaseous mixture to a temperature above that at which high boiling impurity deposits as a solid, expanding the total cooled compressed gaseous mixture to a lower pressure, the expanded gaseous mixture being at a pressure and temperature such that high boiling impurity does not deposit as a solid, passing expanded gaseous mixture in heat interchange relation with product of the fractionating operation in a second heat exchange step, the product in the second heat exchange step being colder than the product in the first heat interchange step to cool expanded gaseous mixture to a temperature below that at which high boiling impurity deposits as a solid so that substantially all high boiling impurity deposits as a solid during the second heat exchange step, cooling substantially impurity-free gaseous mixture in a third heat exchange step in heat interchange relation with cold product of the fractionating operation, switching the flow of expanded gaseous mixture and product of the fractionating operation periodically in the second heat exchange step so that the heat interchange takes place alternately in a pair of zones, and removing deposited impurities from one of the zones when the second heat exchange step takes place in the other zone.

11. The method as set forth in claim 10 wherein warm product leaving the first step of heat interchange is passed through the zones for removing deposited impurity from the zones.

12. The method of cooling compressed gaseous mixture including low boiling components by countercurrent heat exchange with returning cold product of a low temperature fractionating operation and for removing a high boiling normally gaseous impurity from the mixture during the cooling, the compressed mixture being under a pressure greater than the pressure of the fractionating operation, which method comprises passing compressed gaseous mixture in heat interchange relation with partially warmed product of the fractionating operation to cool gaseous mixture to a temperature above that at which high boiling impurity is deposited as a solid, expanding the total cooled gaseous mixture to a lower pressure, the pressure and temperature conditions after expansion being such that the impurity does not deposit as a solid, passing expanded gaseous mixture through a second step of heat interchange relation with product of the fractionating operation colder than the product of the first heat interchange step to cool expanded gaseous mixture to a temperature below that necessary to remove substantially all the impurity as a solid, cooling substantially impurity-free gaseous mixture in a third step of heat interchange relation with cold product of the fractionating operation, the extent of the last-named cooling being regulated to obtain gaseous mixture at a temperature suitable for admission to the fractionating operation, switching the flow of gaseous mixture and returning product periodically so that the second step of heat interchange takes place alternately in a pair of zones and removing deposited impurity from the zones.

13. The method as set forth in claim 12 wherein warm product leaving the first step of heat interchange is passed through the zones for removing the deposited impurity.

14. In a gaseous mixture low temperature fractionating operation for separating low boiling components of gaseous mixture in which compressed gaseous mixture containing high boiling normally gaseous impurity is refrigerated by countercurrent heat exchange with at least one of the products of the fractionation operation to lower the heat content of the gaseous mixture to a desired point and for freezing out the impurity, the method comprising cooling gaseous mixture in a first heat exchange stage to a temperature near but above that point at which high boiling impurity starts to deposit as a solid, further cooling gaseous mixture in a second heat exchange stage to a temperature near but below that point at which high boiling impurity starts to deposit as a solid, expanding further cooled gaseous mixture to a desired pressure for the fractionating operation with an increase of the liquid content of the gaseous mixture to a point undesirable for fractionating operation, passing expanded gaseous mixture in heat exchange relation with gaseous mixture in the second heat exchange stage until sufficient cold has been given up by expanded gaseous mixture to decrease its liquid content to the amount desired for the fractionating operation, switching the flow of gaseous mixture periodically so that the second stage of cooling takes place alternately in a pair of zones, and periodically removing deposited impurity from the zones.

15. The method as set forth in claim 14 wherein warm product of the fractionating operation is periodically passed through the zones for removing deposited impurity therefrom.

16. The method of cooling compressed air by countercurrent heat exchange with cold nitrogen product and cold oxygen product from a low temperature air fractionating operation and for removing carbon dioxide impurity from the air which comprises cooling compressed air to a temperature above that at which carbon dioxide is deposited as a solid by passing compressed air in heat interchange relation with partially warm product of the fractionating operation, expanding compressed and cooled air to an intermediate pressure, the pressure and temperature conditions after expansion being such that carbon dioxide does not deposit as a solid, cooling expanded air to a temperature below that necessary to remove substantially all of the carbon dioxide as a solid deposit by passing expanded air through a second step of heat interchange relation with the cold product from the fractionating operation, switching the flow of air and cold product periodically so the second step of heat interchange takes place alternately in a pair of zones, expanding substantially carbon dioxide-free air to the pressure of the fractionating operation, passing expanded air through one of the zones to obtain the proper liquid content for the fractionating operation, and removing carbon dioxide deposits from the zones.

17. The method as set forth in claim 16 wherein warm nitrogen leaving the first step of heat interchange is passed through the zones for evaporating carbon dioxide which has been deposited therein.

18. The method of cooling compressed air by countercurrent heat exchange with cold nitrogen product and cold oxygen product from a low temperature fractionating operation and for simultaneously removing carbon dioxide from the air which comprises cooling compressed air stream to a temperature above that at which the carbon dioxide impurity is deposited as a solid by passing compressed air through a first step of heat interchange relation with partially warm products of the fractionating operation, expanding the air, cooling expanded air to a temperature below that necessary to remove substantially all of the impurity as a solid deposit by passing it through a second step of heat interchange relation with cold product of the fractionating operation, switching the flow of air and cold product periodically so that the second step of heat interchange takes place alternately in a pair of zones, expanding substantially carbon dioxide-free air to the pressure to be maintained in the fractionating operation, obtaining the proper liquid content for the fractionating operation by passing expanded air through one of the zones in countercurrent heat interchange relation with the air from which carbon dioxide is being deposited, and removing carbon dioxide deposit from the zones.

19. The method as set forth in claim 18 wherein warm nitrogen leaving the first step of heat interchange is passed through the zones for evaporating the carbon dioxide which has been deposited therein.

20. The method of cooling compressed air by countercurrent heat exchange with product of a low temperature air fractionating operation and for removing water and carbon dioxide impurities from the air which comprises, cooling compressed air to a temperature above that at which water deposits as ice in a first step of heat interchange relation with partially warmed product of the fractionating operation, removing water from the cooled air by passing the air through an air drying zone, further cooling air to a temperature above that at which carbon dioxide deposits as a solid in a second step of heat interchange relation with partially warmed product of the fractionating operation colder than the product of the first heat interchange step, expanding compressed and cooled air to an intermediate pressure, the pressure and temperature conditions after expansion being such that carbon dioxide does not deposit as a solid, cooling expanded air to a temperature below that necessary to remove substantially all of the carbon dioxide as a solid in a third step of heat interchange relation with cold product from the fractionating operation, switching the flow of air and product periodically so that the third step of heat interchange takes place alternately in a pair of zones, expanding substantially carbon dioxide-free air to the pressure to be maintained in the fractionating operation, obtaining the proper liquid content for the fractionating operation by passing expanded air through one of the zones in countercurrent heat interchange relation with the air from which the carbon dioxide is being deposited, and removing deposited carbon dioxide from the zones.

21. The method as set forth in claim 20 wherein warm product leaving the first step of heat interchange is passed through the zones for evaporating carbon dioxide which has been deposited therein.

22. The method of cooling a stream of compressed air by countercurrent heat exchange with cold nitrogen product and cold oxygen product of a low temperature fractionating operation and for simultaneously removing water and carbon dioxide impurities from the air which comprises cooling compressed air to a temperature above that at which water deposits as ice in a first step of heat interchange relation with partially warmed products of the fractionating operation, removing water from the cooled air by passing the air through an air drying zone, cooling air from the drying zone to a temperature above that at which carbon dioxide deposits as a solid in a second step of heat interchange relation with partially warmed products of the fractionating operation colder than those in the first heat interchange step, expanding the air, cooling expanded air to a temperature below that necessary to remove substantially all of the carbon dioxide as a solid in a third step of heat interchange relation with the cold products from the fractionating operation, switching the flow of air and cold products periodically so that the third step of heat interchange takes place alternately in a pair of zones, expanding substantially carbon dioxide-free air to the pressure to be maintained in the fractionating operation, obtaining the proper liquid content for the fractionating operation by passing expanded air through one of the zones in countercurrent heat interchange with the air from which the carbon dioxide is being deposited, and periodically removing deposited carbon dioxide from the zones.

23. The method as set forth in claim 22 wherein warm product leaving the first step of heat interchange is alternately passed through the zones for evaporating the carbon dioxide which has been deposited therein.

24. Apparatus for cooling compressed gaseous mixture by countercurrent heat interchange with returning cold product of a low temperature fractionating operation and for removing high boiling impurity from the mixture during the cooling, the compressed mixture being under a pressure greater than the pressure of the fractionating operation, comprising a non-switching heat interchanger having a plurality of passageways therethrough in heat exchange relation with one another, a pair of impurity precipitation chambers arranged in parallel, each of the chambers being provided with a plurality of passageways therethrough in heat exchange relation with one another, expansion means, means for directing gaseous mixture through a first passageway of the heat interchanger to the expansion means and thence through one passageway of one of the chambers, means for directing returning cold product through another passageway of the one chamber in countercurrent flow relation to the gaseous mixture in the one passageway and then through a second passageway of heat interchanger, means for directing warm product from the heat interchanger through the other chamber which is offstream, and means for simultaneously switching the flow of gaseous mixture and returning cold product from the one chamber to the other chamber and the flow of warm product from the other chamber to the one chamber while maintaining the paths of flow of the gaseous mixture and returning product in the heat interchanger.

References Cited in the file of this patent

UNITED STATES PATENTS

| 2,039,889 | DeBaufre | May 5, 1936 |
| 2,113,680 | DeBaufre | Apr. 12, 1938 |
| 2,209,748 | Schlitt | July 30, 1940 |
| 2,423,543 | Yendall | July 8, 1947 |
| 2,496,380 | Crawford | Feb. 7, 1950 |
| 2,503,939 | DeBaufre | Apr. 11, 1950 |
| 2,504,051 | Scheibel | Apr. 11, 1950 |
| 2,552,560 | Jenny | May 15, 1951 |
| 2,584,381 | Dodge | Feb. 5, 1952 |
| 2,671,318 | Collins | Mar. 9, 1954 |

FOREIGN PATENTS

| 454,141 | Great Britain | Sept. 24, 1936 |
| 803,301 | Germany | Apr. 2, 1951 |